(12) United States Patent
Lidbetter et al.

(10) Patent No.: US 11,429,910 B1
(45) Date of Patent: Aug. 30, 2022

(54) DYNAMIC SCHEDULING OF DRIVER BREAKS IN A RIDE-SHARING SERVICE

(71) Applicant: Transit Labs Inc., Waterloo (CA)

(72) Inventors: Thomas F. Lidbetter, Kitchener (CA); Alexander Bailey, Kitchener (CA); Clayton Goes, Waterloo (CA); Prem Gururajan, Kitchener (CA); Rohit Sivakumar, Waterloo (CA)

(73) Assignee: Transit Labs Inc., Waterloo (CA)

( * ) Notice: Subject to any disclaimer, the term of this patent is extended or adjusted under 35 U.S.C. 154(b) by 0 days.

(21) Appl. No.: 17/530,122

(22) Filed: Nov. 18, 2021

Related U.S. Application Data

(60) Provisional application No. 63/229,688, filed on Aug. 5, 2021.

(51) Int. Cl.
*G06Q 10/06* (2012.01)
*G01C 21/34* (2006.01)
*G06Q 50/30* (2012.01)

(52) U.S. Cl.
CPC ... *G06Q 10/06312* (2013.01); *G01C 21/3438* (2013.01); *G06Q 50/30* (2013.01)

(58) Field of Classification Search
CPC ................ G06Q 10/06312; G01C 21/3438
See application file for complete search history.

(56) References Cited

U.S. PATENT DOCUMENTS

| | | | |
|---|---|---|---|
| 8,046,563 | B1 | 10/2011 | Agarwal et al. |
| 8,059,650 | B2 | 11/2011 | Shetty et al. |
| 8,285,571 | B2 | 10/2012 | Demirdjian et al. |
| 8,370,394 | B2 | 2/2013 | Atta et al. |

(Continued)

FOREIGN PATENT DOCUMENTS

| | | |
|---|---|---|
| IE | 20080858 A1 | 6/2009 |
| JP | 2004217333 A | 8/2004 |

(Continued)

OTHER PUBLICATIONS

Julie Ireton, No legal guarantee of bathroom breaks for bus drivers. CBC News. Posted on Dec. 19, 2019. (Year: 2019).*

(Continued)

*Primary Examiner* — Nadja N Chong Cruz
(74) *Attorney, Agent, or Firm* — Erise IP, P.A.

(57) ABSTRACT

Systems and methods for dynamically scheduling breaks for drivers in a ride-sharing service are disclosed. Driver breaks may be scheduled dynamically in the context of a ride-sharing service in which rides may be requested ad hoc and drivers are rerouted accordingly. An allocation system may optimize a drive itinerary to service passengers requesting rides and breaks for drivers. A break request comprising break parameters may be received. The allocation system may attempt an insertion of the break request into the drive itinerary. The drive itinerary may then be validated to determine if all rides can be serviced with the break request entered into the itinerary. If the drive itinerary is not validated, the drive itinerary is modified until the break request is successfully inserted into the drive itinerary. The drive itinerary and driver breaks may be continuously modified and optimized in response to real time events and conditions.

20 Claims, 8 Drawing Sheets

(56) References Cited

U.S. PATENT DOCUMENTS

| | | | |
|---|---|---|---|
| 8,549,096 B2 | 10/2013 | Gulley et al. | |
| 8,612,273 B2 | 12/2013 | Johnson | |
| 8,688,532 B2 | 4/2014 | Khunger et al. | |
| 9,043,151 B2 | 5/2015 | Cai et al. | |
| 9,076,332 B2 | 7/2015 | Myr | |
| 9,146,894 B2 | 9/2015 | Piepgrass et al. | |
| 9,562,785 B1 | 2/2017 | Racah et al. | |
| 9,677,892 B2 | 6/2017 | Lerner et al. | |
| 9,816,824 B1* | 11/2017 | Racah | G01C 21/3415 |
| 9,958,272 B2* | 5/2018 | Morris, IV | G01C 21/3415 |
| 10,197,411 B2 | 2/2019 | Racah et al. | |
| 10,248,913 B1 | 4/2019 | Gururajan et al. | |
| 10,366,460 B2* | 7/2019 | Bhogal | G06Q 50/14 |
| 10,677,604 B1 | 6/2020 | Racah et al. | |
| 10,853,743 B2 | 12/2020 | Gururajan et al. | |
| 2008/0195428 A1 | 8/2008 | O'Sullivan | |
| 2008/0270204 A1 | 10/2008 | Poykko et al. | |
| 2009/0192851 A1 | 7/2009 | Bishop | |
| 2011/0099040 A1 | 4/2011 | Felt et al. | |
| 2011/0301985 A1 | 12/2011 | Camp et al. | |
| 2012/0041675 A1 | 2/2012 | Juliver et al. | |
| 2012/0078672 A1 | 3/2012 | Mohebbi et al. | |
| 2013/0024249 A1 | 1/2013 | Zohar et al. | |
| 2013/0046456 A1 | 2/2013 | Scofield et al. | |
| 2013/0046586 A1 | 2/2013 | Lerner et al. | |
| 2013/0096827 A1 | 4/2013 | McCall et al. | |
| 2013/0238167 A1 | 9/2013 | Stanfield et al. | |
| 2014/0052577 A1 | 2/2014 | Gotlieb et al. | |
| 2014/0129951 A1 | 5/2014 | Amin et al. | |
| 2014/0324505 A1 | 10/2014 | Lerenc et al. | |
| 2014/0365250 A1 | 12/2014 | Ikeda et al. | |
| 2015/0067304 A1 | 3/2015 | Kase et al. | |
| 2015/0100238 A1 | 4/2015 | Cai et al. | |
| 2015/0142518 A1 | 5/2015 | Farinha Gomes Felix | |
| 2015/0161554 A1 | 6/2015 | Sweeney et al. | |
| 2015/0161564 A1 | 6/2015 | Sweeney et al. | |
| 2015/0242944 A1 | 8/2015 | Willard et al. | |
| 2015/0254581 A1 | 9/2015 | Brahme | |
| 2015/0276410 A1 | 10/2015 | Lamoriniere et al. | |
| 2015/0278094 A1 | 10/2015 | Ma et al. | |
| 2015/0324708 A1 | 11/2015 | Skipp et al. | |
| 2015/0324717 A1 | 11/2015 | Lord et al. | |
| 2015/0324729 A1 | 11/2015 | Lord et al. | |
| 2016/0027306 A1 | 1/2016 | Lambert et al. | |
| 2016/0110836 A1 | 4/2016 | Garg et al. | |
| 2016/0138928 A1 | 5/2016 | Guo et al. | |
| 2016/0247095 A1 | 8/2016 | Scicluna et al. | |
| 2016/0247109 A1 | 8/2016 | Scicluna et al. | |
| 2016/0358470 A1 | 12/2016 | Pirwani | |
| 2016/0364679 A1* | 12/2016 | Cao | G06Q 50/30 |
| 2016/0364823 A1 | 12/2016 | Cao | |
| 2017/0169366 A1* | 6/2017 | Klein | G06Q 50/30 |
| 2017/0300848 A1 | 10/2017 | Shoval et al. | |
| 2018/0182249 A1* | 6/2018 | Marueli | G08G 1/005 |
| 2018/0247266 A1* | 8/2018 | Knapp | G06Q 10/08355 |
| 2019/0311307 A1* | 10/2019 | Ramot | G01C 21/343 |

FOREIGN PATENT DOCUMENTS

| | | |
|---|---|---|
| WO | 2012143300 A1 | 10/2012 |
| WO | 2013072729 A1 | 5/2013 |

OTHER PUBLICATIONS

Chan, Nelson D. et al.; Ridesharing in North America: Past, Present, and Future, Transport Reviews; Nov. 4, 2011; pp. 1-22; Routledge.

Dailey, Daniel J. et al.; Seattle Smart Traveler; Oct. 1997; pp. 1-42; WA-RD 444.1/TNW 97-08; Washington State Transportation Center; Olympia, Washington.

Furuhata, Masabumi et al; Ridesharing: The State-of-the-Art and Future Directions; Aug. 22, 2013; pp. 28-46; Transportation Research Part B 57; Elsevier Ltd.

Lane, Nicholas D. et al.; A Survey of Mobile Phone Sensing; Sep. 2010; pp. 140-150; IEEE Communications Magazine.

Tao, Chi-Chung; Dynamic Taxi-sharing Service Using Intelligent Transportation System Technologies; 2007; pp. 3209-3212; IEEE Communications Magazine.

Matloff, Norman; Introduction to Parallel Processing; Mar. 28, 2006; pp. 1-47; Department of Computer Science; University of California at Davis.

Zhiqiang, Wei et al.; The Research and Implementation of GPS Intelligent Transmission Strategy Based on On-Board Android Smartphones, IEEE 2013, 3rd International Conference on Computer Science and Network Technology, 1230-33.

City Mapper; available at: https://www.youtube.com/watch?v=nVNX5pWF2-Q; accessed on: Mar. 3, 2022.

* cited by examiner

| Stop | ETA | Location | Actions | | Status | Locked | Started |
|---|---|---|---|---|---|---|---|
| 1 | 11:46 AM | 123 Main St. | 1 | Pickup (1): J. Doe | Cancelled (Late) | 11:43 AM | 11:43 AM |
| 2 | 11:46 AM | 456 Broadway Blvd. | 0 | Dropoff (1): J. Doe | Cancelled (Late) | 11:46 AM | 11:46 AM |
| 3 | 11:46 AM | 456 Broadway Blvd. | 0 | Break | Completed | 11:46 AM | 11:46 AM |
| 4 | 12:28 PM | Office | 2 | Pickup (2): A. Smith J. Doe | Completed Completed | 11:55 AM | 11:55 AM |
| 5 | 12:50 PM | 456 Broadway Blvd. | 0 | Dropoff (2): A. Smith J. Doe | Completed Completed | 12:28 PM | 12:28 PM |
| 6 | 12:50 PM | 456 Broadway Blvd. | 0 | Break | Completed | 12:28 PM | 12:28 PM |
| 7 | 12:57 PM | Office | 1 | Pickup (1): J. Doe | In Progress | 12:57 PM | 12:57 PM |
| 8 | 12:58 PM | 123 Main St. | 2 | Pickup (1): A. Smith | In Progress | 12:57 PM | 12:57 PM |
| 9 | 04:20 PM | City Hall | 0 | Dropoff (2): A. Smith J. Doe | In Progress In Progress | 12:58 PM | 12:58 PM |
| 10 | 04:20 PM | City Hall | 0 | Break | In Progress | 12:58 PM | 12:58 PM |
| 11 | 04:20 PM | City Hall | 0 | Break | Assigned | 12:58 PM | 12:58 PM |

FIG. 2

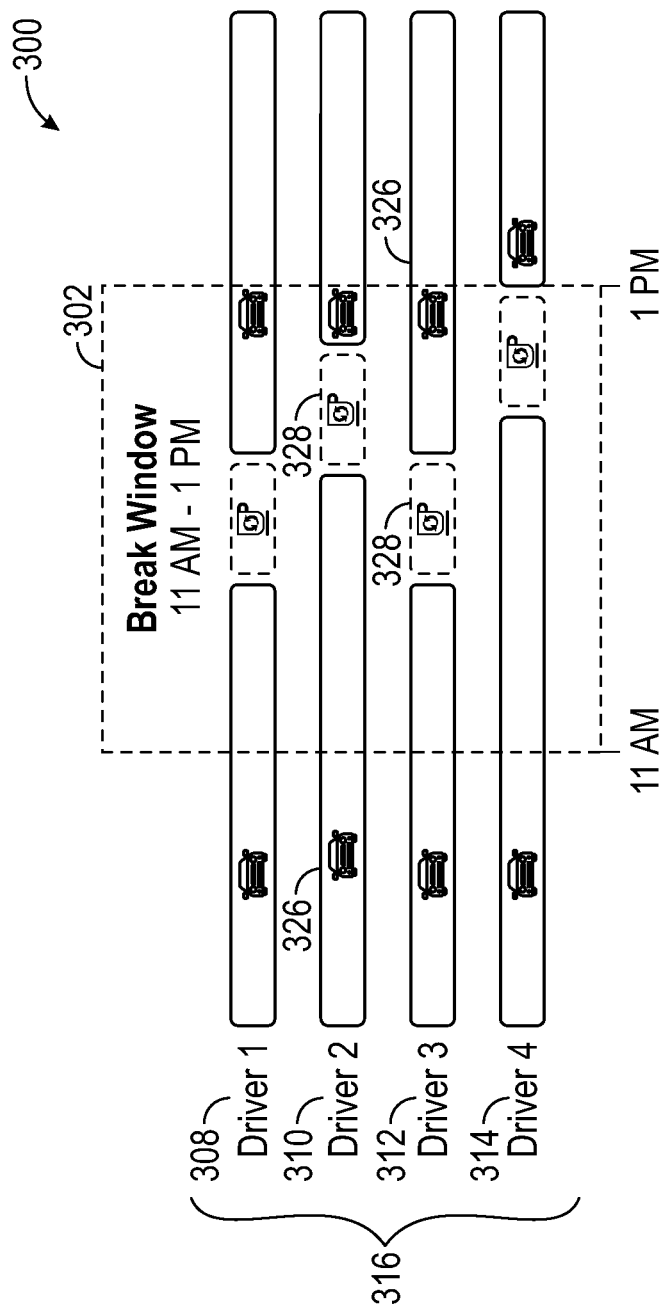

DYNAMIC SCHEDULING OF DRIVER BREAKS IN A RIDE-SHARING SERVICE

RELATED APPLICATIONS

This non-provisional patent application claims prior benefit, with regard to all common subject matter, of earlier-filed U.S. Provisional Patent Application No. 63/229,688, filed Aug. 5, 2021, and entitled "DYNAMIC SCHEDULING OF DRIVER BREAKS IN A RIDE-SHARING SERVICE." The identified '688 provisional patent application is hereby incorporated by reference in its entirety into the present application.

This non-provisional patent application shares certain common subject matter with U.S. patent application Ser. No. 15/406,178, filed Jan. 13, 2017, now issued as U.S. Pat. No. 10,248,913 ("the '913 Patent"), and entitled "SYSTEMS, DEVICES, AND METHODS FOR SEARCHING AND BOOKING RIDE-SHARED TRIPS." The above-identified patent is hereby incorporated by reference in its entirety.

TECHNICAL FIELD

Embodiments generally relate to scheduling breaks for vehicles. More specifically, embodiments relate to dynamically and optimally scheduling breaks for vehicles, including breaks for vehicle drivers, breaks for recharging electric vehicles, and breaks for autonomous vehicles, in real time in response to varying road and ride-share conditions in a ride-sharing service.

RELATED ART

Drivers who drive for transit agencies or fleet operation companies are often contractually required to take breaks at a certain point during their shift. When drivers drive pre-set routes, breaks are typically easy to schedule. For example, drivers driving pre-set routes may be instructed to drive five laps of their route and then take a fifteen-minute break. However, when drivers are driving for transit agencies or fleet operation companies providing a ride-sharing service with no pre-set routes, scheduling driver breaks can become a time-consuming task. New ride requests may be received in real time which cannot be ignored simply because a driver needs to take a break. Transit agencies or fleet operation companies must be able to schedule both the driver's break and the new ride requests. Unlike traditional ride-share services, transit agency or fleet operation companies' drivers (working on a shift) are unable to simply go offline whenever they wish to take a break. Further, transit agencies or fleet operation companies may be legally required to provide drivers with breaks within certain parameters. For example, in California, laws are in place guaranteeing drivers a ten-minute break every four hours and a thirty-minute lunch break every five hours.

Accordingly, a need exists for a way to dynamically schedule driver breaks based on dynamically changing parameters, such as weather and traffic conditions, and real-time and pre-scheduled rides. Breaks for drivers should be scheduled in such a way to cause little to no loss of efficiency in providing rides to riders while meeting requirements for providing drivers breaks.

SUMMARY

Disclosed embodiments address the above-mentioned problems by providing systems and methods for dynamically scheduling driver breaks. In some embodiments, driver breaks are dynamically and optimally scheduled to adhere to various break parameters (e.g., a 15-minute break must be given every three hours) while still maintaining optimum ride-share services for a fleet of vehicles servicing a geographic area.

A first embodiment is directed to a method of dynamically scheduling breaks in a ride-sharing service, comprising receiving a break request for a driver in the ride-sharing service, the break request comprising a set of break parameters for scheduling a break, accessing an itinerary for the ride-sharing service, attempting an insertion of the break at an index of the itinerary, performing a validation of the itinerary to determine if a plurality of stops can be serviced by the ride-sharing service, if the validation of the itinerary was unsuccessful, modifying the itinerary, the modifying comprising a reindexing of at least one stop of the plurality of stops or the break in the itinerary to obtain an updated itinerary, performing a validation of the updated itinerary to determine if the plurality of stops can be serviced by the ride-sharing service, if the validation of the updated itinerary was successful, constraining the break to the updated itinerary, and communicating the updated itinerary to the driver in the ride-sharing service. The itinerary may comprise the plurality of stops, each stop of the plurality of stops comprising at least one of a pick-up time, a pick-up location, a drop-off time, a drop-off location, or the break.

A second embodiment is directed to a system for dynamically scheduling breaks in a ride sharing service, comprising a processor, a data store, a plurality of vehicles, and one or more non-transitory computer-readable media storing computer-executable instructions that, when executed by a processor, perform a method of dynamically scheduling breaks in the ride-sharing service, comprising receiving a break request for a driver in the ride-sharing service, the break request comprising a set of break parameters for scheduling a break, accessing an itinerary for the ride-sharing service, attempting an insertion of the break at an index of the itinerary, performing a validation of the itinerary to determine if the plurality of stops can be serviced by the ride-sharing service, if the validation of the itinerary was unsuccessful, modifying the itinerary, the modifying comprising a reindexing of at least one stop of the plurality of stops or the break in the itinerary to obtain an updated itinerary, performing a validation of the updated itinerary to determine if the plurality of stops can be serviced by the ride-sharing service, if the validation of the updated itinerary was successful, constraining the break to the updated itinerary, and communicating the itinerary to the driver in the ride-sharing service. The driver may be associated with a vehicle of the plurality of vehicles. The itinerary may comprise the plurality of stops, each stop of the plurality of stops comprising at least one of a pick-up time, a pick-up location, a drop-off time, a drop-off location, or the break.

A third embodiment is directed to one or more non-transitory computer-readable media storing computer-executable instructions that, when executed by a processor, perform a method of dynamically scheduling breaks in a ride-sharing service, comprising receiving a break request for a plurality of breaks, the break request comprising a set of break parameters, accessing an itinerary for the ride-sharing service, attempting an insertion of the plurality of breaks into the itinerary, each break of the plurality of breaks inserted into an index of the itinerary, performing a validation of the itinerary to determine if a plurality of stops can be serviced by the ride-sharing service, if the validation of the itinerary was unsuccessful, modifying the itinerary, the modifying comprising a reindexing of at least one stop of the plurality of stops or a break of the plurality of breaks in the itinerary to obtain an updated itinerary, performing a validation of the updated itinerary to determine if the plurality of stops can be serviced by the ride-sharing service, if the validation of the updated itinerary was successful, constraining the break to the updated itinerary, and communicating the updated itinerary to a plurality of drivers in the ride-sharing service. Each break of the plurality of breaks may be associated with a driver of a plurality of drivers in the ride-sharing service. The itinerary may comprise the plurality of stops, each stop of the plurality of stops comprising at least one of a pick-up time, a pick-up location, a drop-off time, a drop-off location, or the break.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 2 illustrates a driver itinerary for certain embodiments;

FIGS. 3A-3C illustrate a dynamically shifting driver break interface for certain embodiments;

Figure 1:
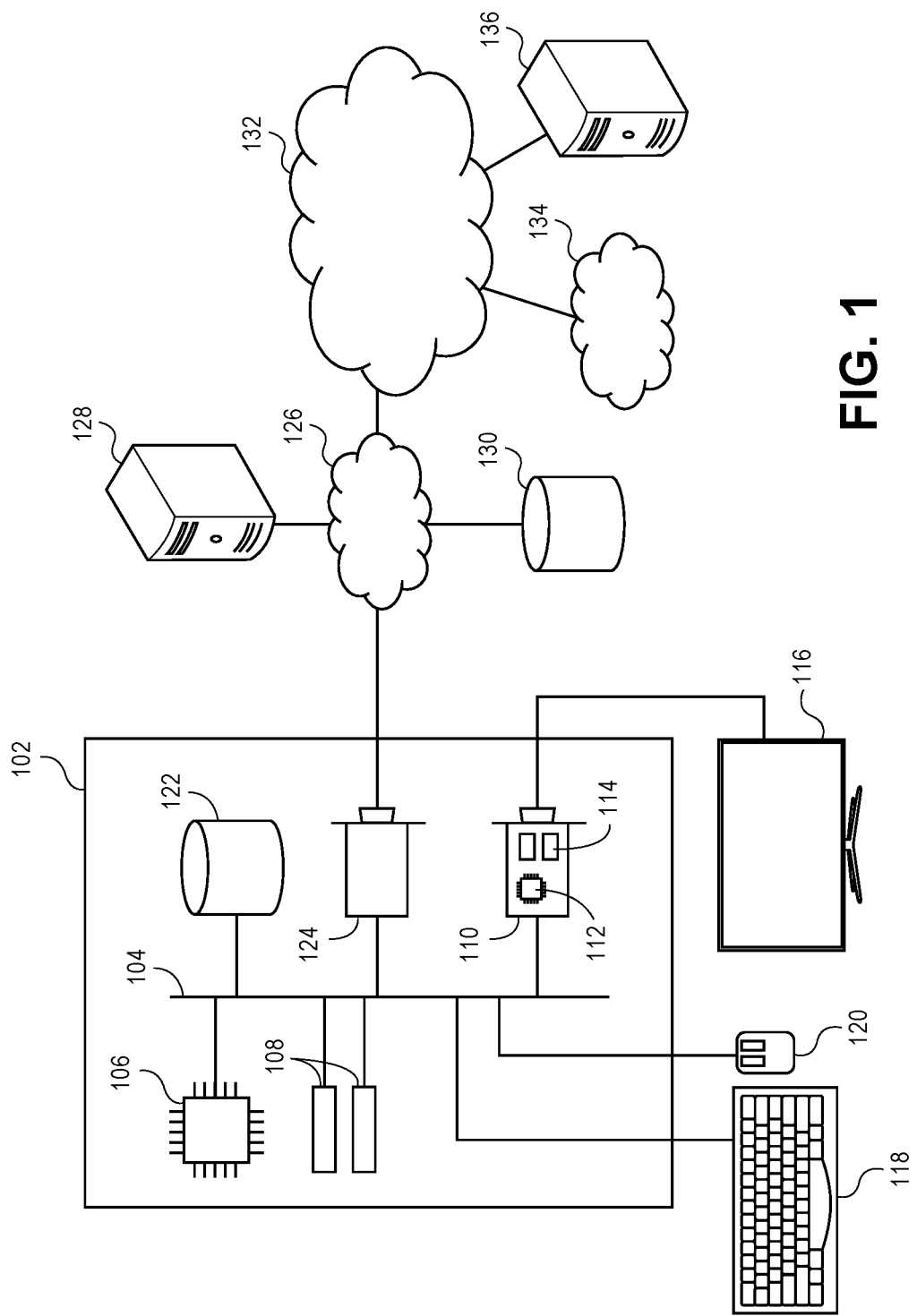
FIG. 1 illustrates an exemplary hardware platform for certain embodiments.

The drawing figures do not limit the invention to the specific embodiments disclosed and described herein. The drawings are not necessarily to scale, emphasis instead being placed upon clearly illustrating the principles of the disclosure.

DETAILED DESCRIPTION

Methods for dynamically scheduling driver breaks in a ride-sharing system are described herein. Breaks may be scheduled in an optimal manner such that riders are not negatively affected by the ride-sharing system sending a driver or drivers on break. For example, if sending a driver on break at 1:00 pm would result in all rides at 1:00 pm being delayed by a certain amount of time (e.g., 15 minutes), the break may not be scheduled at 1:00 pm. The ride-sharing system may attempt to move the break to a different time and analyze how sending the driver on break at the different time would affect providing rides. Break parameters may be configured such that breaks are required to be provided to meet the pre-configured break parameters. For example, break parameters or rules may be initialized that require all drivers operating in a fleet to be provided a ten-minute break within three hours of the drivers' shift starting. Other parameters may be configured such as an earliest time for a break to start, a latest time for a break to end, a break duration, a break location, a maximum number of drivers that may be on break at a single time, or a minimum number of available drivers (i.e., driver not on break) at any given time. An allocation system may use various optimization algorithms to optimally schedule both rides for riders and breaks for drivers. The allocation system may use various metaheuristics to optimize an itinerary that details rides and breaks to be provided by the ride-sharing service. The breaks may also be adjusted in response to external factors such as a driver showing up late for their shift, a driver falling behind schedule, or a rider failing to arrive for a scheduled pick-up. Rides and breaks may be dynamically and continuously adjusted in real-time to ensure necessary requirements are met. In some embodiments, various other events may be dynamically scheduled, such as a recharging time for an electric vehicle or a servicing time for an autonomous vehicle.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Turning now to FIG. 1, in which an exemplary hardware platform for certain embodiments is depicted. Computer 102 can be a desktop computer, a laptop computer, a server computer, a mobile device such as a smartphone or tablet, or any other form factor of general- or special-purpose computing device containing at least one processor. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, such as non-transitory computer readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

The above-described computing components are implemented as a distributed computing system. As such, the workload for determining ride-sharing itineraries may be separated into various subgroups and processed in parallel, thus increasing computation efficiency and decreasing response times. In some embodiments, the computing components may be hosted in a cloud computing system. In some embodiments, the computing components may be implemented using one or more virtual machines to emulate a cloud computing system.

FIG. 2 illustrates itinerary 200 for some embodiments. Itinerary 200 may be presented to an employee at a transit agency or fleet operator overseeing drivers driving the scheduled routes or may be presented to the drivers themselves. As used herein, an itinerary outlines a schedule for a driver or drivers to follow. In some embodiments, each driver has an associated itinerary 200. Itinerary 200 may comprise one or more stops (also referred to as legs or steps), with each stop comprising pick-up times, drop-off times, pick-up locations, drop-off locations, breaks, break times, break locations, recharging times, or recharging locations. Itinerary 200 may also comprise additional information about the passengers, such as the name of a passenger or a photo associated with the passenger. A passenger may schedule a trip with the ride-sharing service and may define at least one of a pick-up time, a pick-up location, a drop-off time, an arrive-before time, a depart-after time, a pick-up time window, and a drop-off location for the trip. The passenger may also include other ride constraints when requesting a ride, such as a delay tolerance and a seating preference or requirement (e.g., handicap accessibility needed). In some embodiments, the delay tolerance defines an acceptable excess time or distance incurred from utilizing the ride-sharing service as compared to the passenger driving themselves directly from the pick-up location to the drop-off location.

Based on the received rides, an allocation system may dynamically route and re-route drivers to pick up passengers. The allocation system may attempt to optimally determine itinerary 200 for pre-booked trips prior to the pre-booked trips being serviced, such as the day before the pre-booked trips are scheduled using a pre-travel optimizer. A real-time optimizer may dynamically adjust itinerary 200 in real time based on various dynamically changing parameters. For example, road conditions (e.g., a car accident) may cause the real-time optimizer to re-route drivers. For example, a first driver may have a first pick-up at a first location followed by a second pick-up at a second location. Between the first pick-up and the second pick-up, an accident may occur that would cause a ten-minute delay in the first driver arriving at the second location. As such, the real-time optimizer may re-route a second driver, who may be unaffected by the delay caused by the accident, to the second pick-up. In such a way, both the first pick-up and the second pick-up may be serviced with zero to minimal delay due to the accident.

In some embodiments, the allocation system attempts to find a best objective value for itinerary 200. The allocation system may generate multiple variations of itinerary 200 and choose the variation with the best objective value. Various metrics may be utilized for the objective value. For example, a number of stops or legs of itinerary 200, cost per passenger mile, total vehicle driving time, total vehicle driving distance, a metric of relative delay (discussed further below), passenger constraint violations, break parameter violations, break constraint violations, recharging parameter violations, or a combination thereof may be utilized for the objective value. The allocation system, including the pre-travel optimizer, the real-time optimizer and the objective values, is discussed in further detail in the '913 Patent, the entirety of which is herein incorporated by reference.

The allocation system may attempt to schedule itinerary 200, including all the breaks, prior to the day of service using the pre-travel optimizer. The pre-travel optimizer may receive a plurality of variations of itinerary 200 and attempt to optimize the variations to find an itinerary 200 with the best objective value. The pre-travel optimizer may utilize various metaheuristic techniques in determining the best objective value. Other optimization techniques such as branch and bound, branch and price, genetic algorithms, ant colony optimization, Tabu search, or a combination thereof may be utilized when determining the best itinerary 200. In some embodiments, the pre-travel optimizer uses removal and insertion heuristics to create variations of itinerary 200. As used herein, an insertion of a break into itinerary 200 comprises a placement of the break stop into an index of itinerary 200. Once breaks are inserted into itinerary 200, the breaks may be moved to various other indices within itinerary 200 to optimize itinerary 200, as will be discussed further below. As used herein, a removal of a break from itinerary 200 comprises removing the break from the specific index within itinerary 200 but does not necessarily mean the break was entirely removed from itinerary 200. Breaks may be removed from an index within itinerary 200 and inserted into a different index to optimize itinerary 200.

Returning now to FIG. 2, itinerary 200 may be presented in tabular form as illustrated. In some embodiments, header row 202 comprises a plurality of column headers: stop 204, Estimated Time of Arrival (ETA) 206, location 208, passengers 210, actions 212, status 214, locked time 216, and start time 218. In some embodiments, header row 202 comprises other columns, such as a finished time column to indicate when a stop 204 was completed.

In some embodiments, stop 204 represents a stop or leg of itinerary 200. As described above, each stop 204 in itinerary 200 describes an action performed by the driver. Stops 204 may take various types, such as a pickup, a drop off, a pickup and drop off at the same location, and a break. In some embodiments, a break stop 204 is defined by at least one of an earliest start time, a latest end time, a break duration, or a break location. In some embodiments, other stops 204 may be represented in itinerary 200 such as a stop for refueling or recharging or a stop to drive to a location where no pickup or drop off occurs. For example, a first driver may have a stop 204 to drive to a specific location to hand the vehicle over to a second driver when the first driver's shift is over. As another example, the first driver may have a final stop 204 to drive the vehicle back to a home location at the end of a shift.

Itinerary 200 may also comprise estimated time of arrival (ETA) 206 indicating an estimated time for stop 204 to be completed. ETA 206 may be determined based on a variety of factors, such as road, traffic, and weather conditions, distance between stops 204, or a combination thereof. ETA 206 may be constantly updated as the driver completes stops 204 in itinerary 200. In some embodiments, ETA 206 is updated for only the subsequent stop 204 in itinerary 200. In some embodiments, ETA 206 is updated for all stops 204 in itinerary 200.

In some embodiments, itinerary 200 comprises location 208. Location 208 may detail the location associated with stop 204. In some embodiments, location 208 is presented as an address (e.g., 123 Main St.), as a defined location (e.g., City Hall), or as coordinates.

Itinerary 200 may further be detailed with passengers 210 which may indicate the number of passengers 210 present in the vehicle once a stop 204 is completed. For example, if passenger J. Doe is picked up at stop one in itinerary 200, passengers 210 will be "1" in the row for stop one. Likewise, when J. Doe is dropped off at stop two in itinerary 200, passengers 210 returns to "0".

Actions 212 may detail the specific actions the driver is instructed to take during stop 204 at the associated location 208. Once driver completes actions 212, stop 204 may be considered complete, and the driver can proceed to the next stop 204. In some embodiments, actions 212 indicates one of a pickup, a drop off, a break, a refuel, a return to a home location, or a combination thereof. In some embodiments, stop 204 comprises multiple actions 212 at location 208, such as pick up A. Smith and drop off J. Doe at 123 Main St.

A break may be provided to drivers during their shifts. As described above, breaks may be mandated by a union, state, or federal law. As such, the allocation system may generate breaks in itinerary 200 to satisfy the break requirements. In some embodiments, breaks are not provided due to legal requirements and instead may be configurable based on policies of the transit agency or fleet operator employing the driver or may be configurable by the drivers themselves. Broadly, the break requirements may comprise a break frequency and a break duration. For example, a transit agency or fleet operator may provide drivers with a fifteen-minute break every two hours. As another example, a driver may be able to choose to take a thirty-minute break every four hours. In both of the above examples, the break requirements may be configurable and adhered to by the allocation system. Itinerary 200 may be optimized to adhere to the specified break requirements while optimally servicing the requested rides as will be discussed in further detail below. In some embodiments, the allocation system is configured to schedule breaks based on global constraints, such that all itineraries 200 for a day's schedule in the ride-sharing service are considered when scheduling breaks and rides. For example, the allocation system may analyze all itineraries 200 to reduce or prevent break overlap between drivers such that only a single driver is on break at one time.

In some embodiments, drivers can specify break preferences that may be considered by the allocation system when scheduling breaks. For example, a driver may specify that they prefer to take a break towards the end of their shift. This information may then be taken into account when scheduling breaks. In some embodiments, driver preferences are overridden or given lower priority when optimizing itinerary 200 in order to service all rides efficiently. Additionally, as will be discussed below, drivers may also indicate break locations at which they would like to serve their break.

In some embodiments, breaks are represented in a break data structure comprising a set of break parameters. The break parameters may comprise an earliest start time and a latest end time. For example, the earliest start time may be 11:00 am and the latest end time may be 1:00 pm such that all breaks must be served between 11:00 am and 1:00 pm, as will be discussed in more detail below. The break parameters may also comprise a break duration to indicate a length of time for the break (e.g., 15 minutes). In some embodiments, the break duration is specified in seconds, minutes, or hours. In some embodiments, the break parameters comprise break locations, such as a restaurant, a coffee shop, or a rest stop, indicating where the driver should serve the break. Generally, the break location may be any address or coordinate location. In some embodiments, the break location is restricted to the geographical area in which the ride-sharing service is operating. In some embodiments, drivers may serve breaks in a range outside of the geographical area for the ride-sharing service, such as within a five-mile radius outside of the geographical area. In some embodiments, multiple break locations may be specified, and the allocation system may dynamically decide which break location to send a driver to for the break. The break location may be selected to minimize a distance or time driven by the driver. In some embodiments, the distance or time may be minimized between the last stop 204 completed before the break, the break location, and the first stop 204 to be completed after the break is over.

In some embodiments, break parameters can be set to deny drivers breaks. For example, if a driver shows up late to their shift, specified break parameters may be set to not provide the driver a break. In some embodiments, denying breaks may be accomplished using a threshold or a percentage value. For example, any driver showing up more than one hour late to their shift or any driver who shows up late and misses more than 25% of their shift may be denied a break.

In some embodiments, breaks cannot be served unless various conditions are met. For example, a driver cannot be sent on break if the driver still has passengers 210 in transit. Generally, breaks may be served once the driver has no passengers 210 and the current time is in the specified time range for serving the break. For example, if the earliest break time is 11:00 am, the driver may not be sent on break before 11:00 am even if the driver has a period of time in itinerary 200 with no passengers 210 in-transit. If a specified break condition cannot be met at the scheduled time of the break, the break may be shuffled within itinerary 200. Another break condition that may allow for a break to be scheduled may be the absence of passengers 210 in the vehicle and no unlocked stops 204 in itinerary 200. As described in detail in the '913 Patent, the allocation system may dynamically unlock various stops 204 that may be unable to be serviced based on the current driver availability. For example, if there are four drivers currently on duty and five passengers 210 requesting pick-up at differing locations at the same time, one of the five passengers 210 may be deemed to be unserviceable and moved to an "unlocked" state. When stops 204 are unlocked, the allocation system may attempt to rearrange the various drivers and rides in order to service all unlocked rides. As such, drivers may not be sent on break if there are any unlocked stops 204 because the drivers may be used to serve the unlocked stops 204.

Breaks may also comprise a set of conditions or a to-do list that must be fulfilled while a driver is on break. For example, drivers may be required to refuel or recharge their vehicle during break. As another example, drivers may be required to do a safety check, such as a circle check, during a break. The circle check may require drivers to take pictures of the condition of the vehicle and transmit the images to the transit agency or fleet operator, as will be discussed further below. The to-do list for breaks may be determined based on various parameters to reduce redundancy. For example, a driver may be required to refuel or recharge only if it is detected that the gas/battery level of the vehicle is below 50% or another pre-defined threshold. Likewise, drivers may only be required to do a circle check if the break occurs past the halfway point of the driver's shift, for example. In some embodiments, when a driver is required to perform off-break checklist items, the break duration may be increased to account for an expected amount of time for the tasks to be completed. For example, a break in which the driver is required to refuel may be extended by five minutes to allow time for refueling.

In some embodiments, breaks are assigned a state. The break state may be one of an assigned state, an in-progress state, a cancelled state, or a completed state. Breaks in the assigned state may have been assigned a break in a certain time frame that has yet to be completed. Breaks that are in the in-progress state may be currently being served by a driver. Breaks may be cancelled by the driver or by the itinerary manager. In some embodiments, breaks having a cancelled state are removed from itinerary 200. When a driver completes a break, the break status for the break may be changed to a completed status.

Status 214 may indicate the current status of stop 204. As illustrated in FIG. 2, stops 204 may take on various statuses 214. For example, a complete status 214 may indicate a stop 204 was completed; an in progress status 214 may indicate the stop 204 is currently being completed; and an assigned status 214 may indicate the stop 204 is to be completed and has yet to be started. Other statuses 214 may be present for various other events. For example, a cancelled status 214 may indicate passenger 210 cancelled their ride. As another example, a no-show status 214 may indicate passenger 210 did not cancel their ride but also did not show up for their ride. Generally, status 214 may be used to describe a current state of stop 204.

In some embodiments, itinerary 200 comprises locked time 216 to indicate when stop 204 was locked. As described above and in the '913 Patent, the allocation system locks and unlocks rides dynamically to schedule itinerary 200. As such, locked time 216 may indicate the time at which the allocation system locked stop 204. In some embodiments, once locked, a stop 204 must be completed by the assigned driver and will not be shifted within itinerary 200 in response to new information. Itinerary 200 may also comprise start time 218 to indicate when a stop 204 was started. In some embodiments, start time 218 is recorded by the driver interacting with a mobile application. In some embodiments, start time 218 is set by determining the driver has arrived at location 208 via a GPS sensor. In some embodiments, start time 218 is recorded for a stop 204 by determining that the driver has left location 208 of the previous stop 204.

Itinerary 200 may comprise various other trip-related details. As described above, itinerary 200 may also include a finished column to indicate when the stop 204 was finished. Like start time 218, the finished time may be determined from driver input via an associated mobile application or via a location sensor to determine when the driver leaves location 208 associated with stop 204.

Figure 3A:
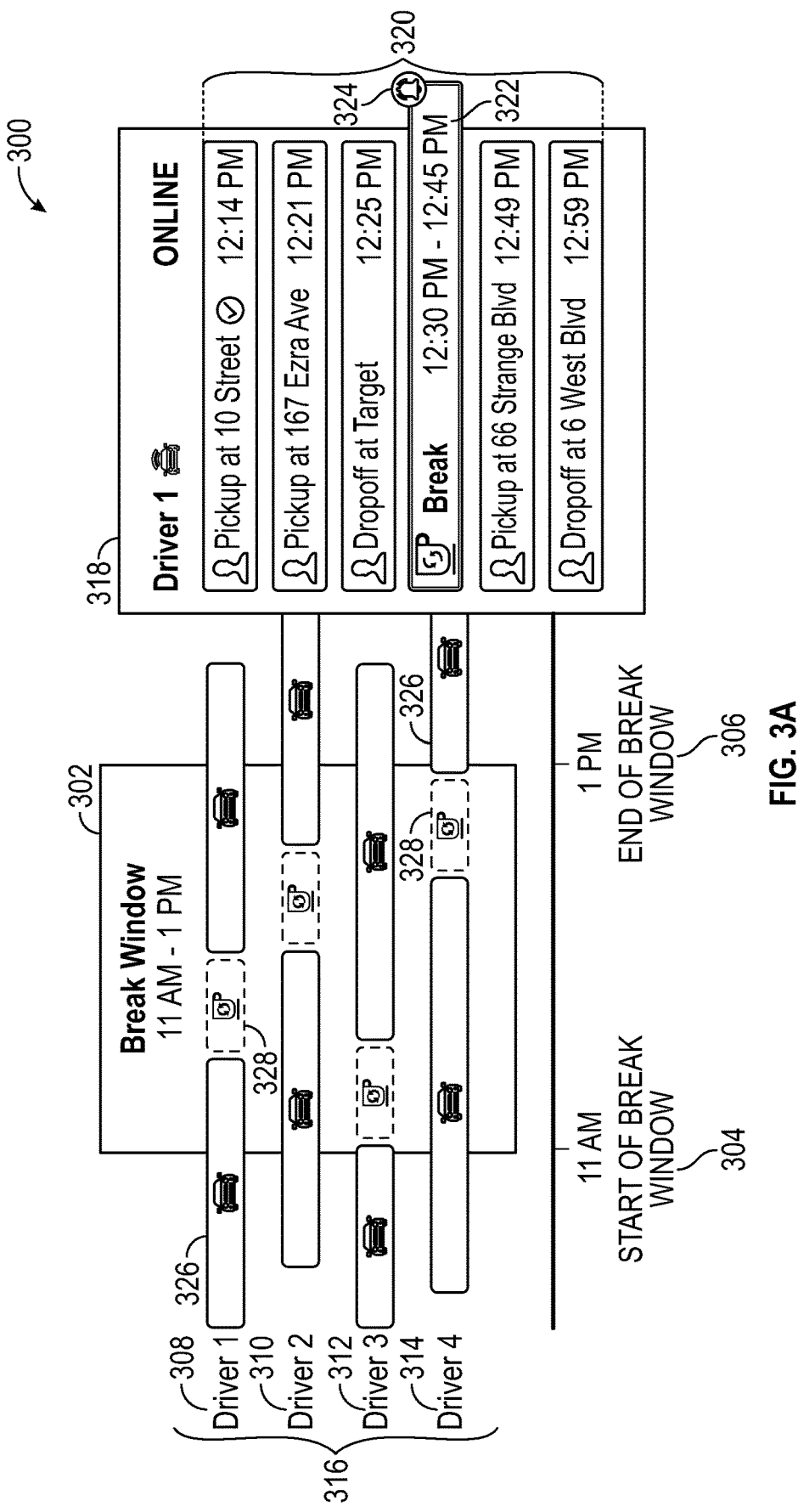

FIG. 3A illustrates breaks interface 300 for some embodiments. Breaks interface 300 may be present on a mobile or web application associated with the ride-sharing service and may be viewed on a mobile phone, tablet, web browser, or the like. As depicted, breaks interface 300 may comprise break window 302, break window start time 304, break window end time 306, first driver 308, second driver 310, third driver 312, and fourth driver 314 (collectively referred to as drivers 316). Breaks interface 300 may also comprise itinerary pane 318 comprising ride details 320, break 322, and notification toggle 324. In some embodiments, itinerary pane 318 may be viewed by actuating a control on breaks interface 300. In some embodiments, breaks interface 300 may be displayed side-by-side or in the same window (e.g., on a mobile phone or computer 102) as itinerary pane 318. Itinerary pane 318 has been omitted from FIGS. 3B and 3C for clarity.

Figure 3C:
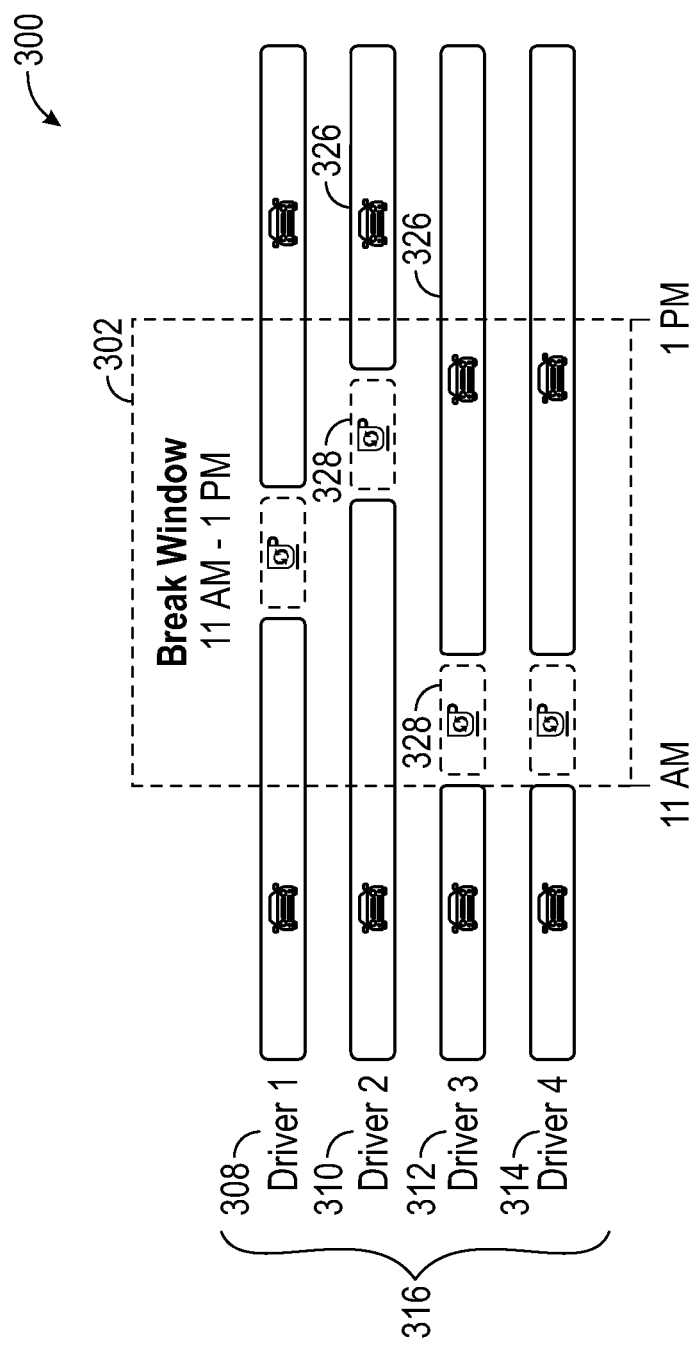

Break window 302 may be one of the break parameters initialized for dynamically determining breaks 322 as described above. As illustrated in FIGS. 3A-3C, the break parameters for break window 302 have been set as break window start time 304 at 11:00 am and break window end time 304 at 1:00 pm. As such, the optimization algorithm may dynamically determine breaks for all drivers 316 within break window 302 and not provide breaks to drivers 316 at any time outside of break window 302. In some embodiments, breaks in break window 302 may be optimized to satisfy one or more constraints on the break, including the break duration, break frequency, driver preferences, minimizing overlap between drivers going on break, or any combination thereof. In some embodiments, break window 302 may be optimized to be scheduled at the optimum time. For example, the timing of break window 302 may be optimized and shifted in response to a sporting event or a concert occurring such that break window 302 does not overlap with the event. In some embodiments, multiple break windows 302 may be initialized. For example, it may be desired to have all drivers 316 available during peak times, such as the evening rush hour. As such, break window 302 may be set to be between 3:00 pm-5:00 pm and between 7:00 pm-9:00 pm with no breaks occurring between 5:00 pm-7:00 pm. In this manner, each of drivers 316 may be provided break 322 within one of the two time frames. In breaks interface 300, break window 302 may be highlighted, boxed, magnified, or otherwise called out to emphasize the range for break window start time 304 and break window end time 306. In some embodiments, break window 302 is not specified; instead, the break parameters may detail that breaks 322 must be served within a certain time period after drivers 316 shift has started, such as four hours after the shift begins.

Also illustrated in breaks interface 300 is a graphical depiction of the scheduled breaks for drivers 316 representing a simplified version of itinerary 200. The graphical depiction may comprise ride indicators 326 to indicate to drivers 316 when they are servicing passengers 210 and break indicators 328 to indicate to drivers 316 when they are currently scheduled to be on break. As described above, itinerary 200 may be updated dynamically in real-time based on various states of the ride-sharing service and reflected in the graphical depiction shown in FIGS. 3A-3C.

For example, looking now at FIGS. 3A and 3B, a large influx of passengers 210 may request a ride near 11:00 am when third driver 312 is scheduled to go on break (as illustrated in FIG. 3A). The allocation system may then determine that all four drivers 316 are needed to efficiently transport the large influx of passengers 210 in addition to any passengers 210 who had pre-booked a ride near 11:00 am. When each new ride request from the influx of passengers 210 is received, the optimization algorithm may attempt various insertions of the new rides into itinerary 200 to attempt to service all the new passengers 210 while finding the itinerary 200 with the best objective value. As such, the allocation system may delay the start of the break for third driver 312 to ensure passengers 210 are picked up and dropped off on time. As shown in FIG. 3B, break 322 for third driver 312 was dynamically shifted back such that all drivers 316 are driving at 11:00 am to allow for passengers 210 to be served efficiently and is now being served at the same time as first driver 308. In some embodiments, breaks 322 for drivers 316 may overlap if it is determined that all rides at the break time can be serviced by drivers 316 who are not on break. In some embodiments, a maximum number of drivers 316 who can be on break 322 at the same or overlapping times may be a break parameter. In other embodiments, a minimum number of available drivers 316 at any given time may be a break parameter.

Continuing with the above example, another new ride request may be received near the new break time for third driver 312. Consequently, the optimization algorithm may attempt to re-optimize itinerary 200 in real time in order to service the new ride request. This re-optimization may result in break 322 for third driver 312 shifting back again, while still staying within break window 302. As an example, it may be determined that the new ride request can be served best by third driver 312 because third driver 312 is nearest to the pick-up location 208. As such, itinerary 200 may be rearranged and breaks 322 for third driver 312 and fourth driver 314 may be swapped such that the new ride request may be serviced while all drivers 316 can still be provided breaks 322 within break window 302.

As another example, referring now to FIGS. 3A and 3C, a lull in ride requests may result in dynamically shifting breaks 322 for drivers 316. As shown in FIG. 3A, drivers 316 are scheduled to take breaks 322 at various times throughout break window 302. Consider the case where passenger 210 has a scheduled pick-up time for 11:00 am but does not show up for the pick-up. Based on this new information, the optimization algorithm may determine a new itinerary 200, as illustrated in FIG. 3C, with break 322 for fourth driver 314 moving up to be served concurrently with break 322 for third driver 312. In some embodiments, the optimization algorithm is weighted to provide breaks 322 nearer to break window start time 304 to help avoid all drivers 316 being scheduled to serve breaks 322 near break window end time 306. In some embodiments, the optimization algorithm is configured to minimize or otherwise mitigate break overlap between drivers 316.

In some embodiments, only one new passenger 210 requesting a ride may cause breaks 322 for drivers 316 to shift. For example, drivers 316 may be serving a large geographical area, such as a city, which may take a substantial amount of time for drivers 316 to traverse. First driver 308, second driver 310, and fourth driver 314 may be servicing passengers 210 in one area of the city, while third driver 312 may be driving alone in a second area of the city and may be scheduled to take break 322 in five minutes. A new ride request may be received for a pickup in the second area of the city near third driver 312. While first driver 308, second driver 310, and fourth driver 314 may have the capacity to service the new ride request, it may take twice as long for first driver 308, second driver 310, or fourth driver 314 to reach the requested pick-up location for the new ride request. As such, the allocation system may shift and delay the break for third driver 312 to service the new ride request. In some embodiments, since drivers 316 are not operating at max or near-max capacity, the allocation system may swap breaks 322 for third driver 312 and first driver 308 to allow for a break 322 to still be served at the scheduled break time for third driver 312.

Dynamically changing traffic conditions may play a role in break 322 being shifted for drivers 316. As another example, the pre-travel optimizer may have optimally scheduled itinerary 200 as described above. However, on the day the rides are to be serviced, construction work may have begun, affecting the ability of drivers 316 to service the rides on time based on breaks 322 initially scheduled by the pre-travel optimizer. As such, itinerary 200 may be adjusted in real time to adjust to any traffic delays caused by the construction work.

As described above, breaks 322 may be associated with various break locations. Break locations may include refueling stations, recharging stations, or check-in locations. Drivers 316 driving a gas vehicle may be directed to a gas station for refueling, while drivers 316 driving an electric vehicle may be directed to a recharging station for break 322. In some embodiments, for example, when the vehicle is an autonomous vehicle, breaks 322 may be configured to direct the autonomous vehicle to a check-in location for maintenance, recharging, or refueling. In some embodiments, when it is detected that drivers 316 reach the break location (e.g., via GPS on a mobile phone associated with the driver or on a vehicle associated with the driver), break 322 immediately begins. In some embodiments, if multiple break locations are available for drivers 316, rides may be better served by specifying a break location based on itinerary 200. For example, fourth driver 314 may be scheduled to take a break from 12:45-1:00 and may have a break location on the south side of the city, a break location in the middle of the city, and a break location on the north side of the city. Just before going on break 322, fourth driver 314 may have a drop-off stop 204 in the south side of the city, while the first stop 204 after finishing break 322 may be located in the north side of the city. As such, fourth driver 314 may be instructed to head to the break location in either the middle of the city or in the north side of the city such that fourth driver 314 is closer to the pick-up location 208 for the stop 204 after the break is over. If fourth driver 314 completes the stop 204 before break 322 and only has a few minutes to arrive at the break location, the break location in the middle of the city may be selected such that fourth driver 314 arrives to the break location before the break begins while still being closer to the pick-up stop 204 after break 322 ends. Alternatively, if fourth driver 314 has enough time to reach the break location in the north side of the city before break 322 starts, the north side break location may be selected instead, thus allowing for fourth driver 314 to be near to the pick-up location 208 for the stop 204 after break 322. In some embodiments, break locations are specified solely based on the break location closest to location 208 of the last completed stop 204 before break 322 begins.

In some embodiments, break 322 may not have a specified break location. In such a case, the break location may be set to be the current location of the driver. In some embodiments, if the driver is completing a stop 204 and going on break 322 immediately after completion of the stop 204, the break location may be set to be location 208 for the stop 204. In some embodiments, the location of drivers 316 is tracked continuously while drivers 316 are on break. As such, itinerary 200 may be dynamically adjusted based on the location of drivers 316 as they serve break 322. For example, if first driver 308 goes on break 322 and takes break 322 at a location near a pick-up location for second driver 310, itinerary 200 may be dynamically updated such that first driver 308 performs the pick-up for second driver 310 because first driver 308 is near to the pick-up location when break 322 ends. Consequently, because first driver 308 is performing a stop 204 for second driver 310, the break 322 for second driver 310 may also be readjusted in itinerary 322. Alternatively, the location of drivers 316 may not be tracked while on break. This may be the case when breaks 322 have a set location and it may be assumed that drivers 316 remain at the set location for the duration of break 322.

Returning now to FIG. 3A, itinerary pane 318 may provide ride details 320 relating to pick-up times, pick-up locations, drop-off times, drop-off locations, break times, break locations, an arrive-before time, a depart-after time, a pick-up time window, a refueling time, a recharging time, a refueling location, or a recharging location and any other related information for drivers 316 to complete their itineraries 200. As described above, a refueling location may be a gas station or the like for refueling the vehicle. Refueling locations may be entered as a defined location (e.g., a QuikTrip), as an address (e.g., 789 Fifth St.), or as coordinate locations. Similarly, recharging stations for recharging electric vehicles may be specified as a defined location, an address, or a coordinate location. In some embodiments, itinerary 200 uses a digital API to determine recharging availability at a location. If the nearest recharging station has no availability, the API may find the next, closest recharging station to the current location of the vehicle for recharging. In some embodiments, if all nearby recharging stations are full, the vehicle may be sent to the nearest recharging station and instructed to wait until a recharging station opens. In some embodiments, itinerary 200, utilizing the API, is configured to reserve charging stations for electric vehicles when optimizing the schedule. Reservations may be pre-booked during pre-trip optimizer optimizing itinerary 200 and may be dynamically cancelled and adjusted in real-time. The reservation API is discussed in further detail below with respect to FIG. 5.

Various other parameters besides the proximity of a driver 316 to the refueling or recharging station may also be considered when determining a refueling or recharging station to send drivers 316 during break 322. For example, the estimated time for driver 316 to arrive at the recharging station may be considered. Similarly, the driving distance to the recharging station may be analyzed to minimize the distance traveled from the current location to the break location. Driving distance and estimated driving time to the pick-up location after break 322 may also be considered when determining a recharging or refueling station. Similar to determining break locations, such as a coffee shop or a rest stop, refueling locations may be selected to minimize the driving time and/or distance between the last drop-off before break 322 for refueling, the refueling location, and the first pick-up after break 322 ends. In some embodiments, refueling or recharging stations may be selected based on their proximity to nearby amenities. For example, if a driver 316 has a break location set for a local restaurant, nearby gas stations or recharging stations may be given preference when determining where driver 316 should refuel or recharge while on break 322.

Break 322 may comprise a break start time and a break end time as illustrated. Break 322 may also comprise a notification toggle 324 to allow notifications to be sent to drivers 316 to start their breaks. Notifications may be sent to drivers 316 via a mobile device. In some embodiments, notifications are sent at a predetermined time, such as five minutes prior, to the start of break 322. Notifications may also be sent before break 322 ends or right when break 322 ends to remind drivers 316 that their break 322 is over and they should begin their next stop 204.

Figure 4:
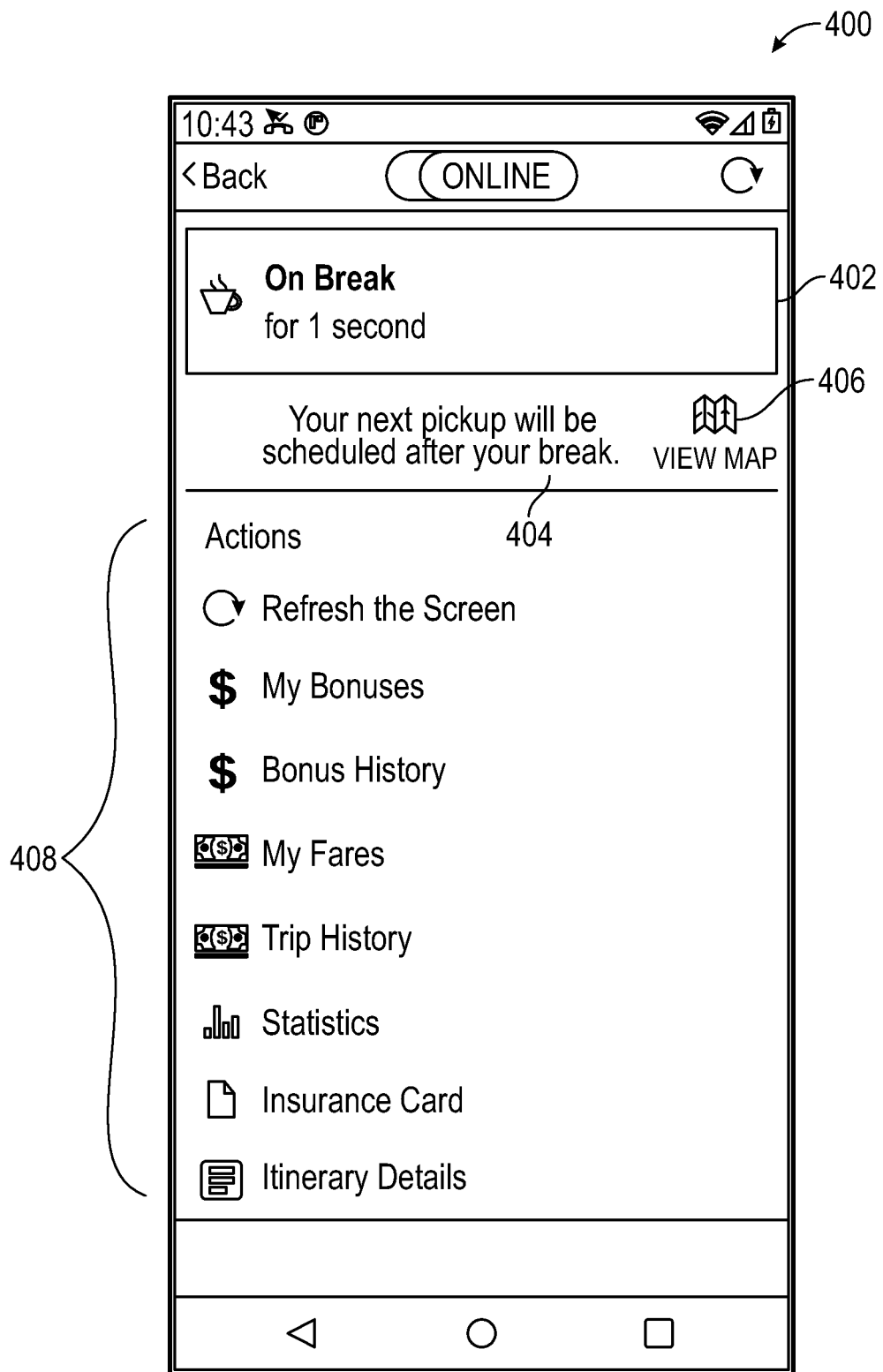
FIG. 4 illustrates a user interface for an application associated with a driver of the ride-sharing service.

FIG. 4 illustrates driver interface 400 for some embodiments. As illustrated, driver interface 400 comprises break header pane 402 indicating that a driver is on break 322. In some embodiments, break header pane 402 comprises the break duration (e.g., 11:15-11:30) or time left for the break (e.g., a notification stating, "You have five minutes left on your break.") to identify to drivers 316 when their break 322 ends. In some embodiments, driver interface 400 comprises stop details pane 404 detailing the next stop 204 for the driver when the break 322 is over. As illustrated, stop details pane 404 indicates that no pick-up stop 204 is scheduled for when the driver returns from break 322. If a stop 204 is scheduled, stop details pane 404 may instead display location 208 of the stop 204 and/or a pick-up time or other details relating to stop 204. In some embodiments, location 208 may be viewed by actuating view map toggle 406.

Also present on driver interface 400, in some embodiments, is actions pane 408. Actions pane 408 may comprise a plurality of actuatable links to display additional information for the driver. For example, as illustrated in FIG. 4, actions pane 408 comprises toggles for refreshing the screen, driver bonuses, driver bonus history, drive fares, trip history, statistics, insurance, and itinerary 200 details. Actions pane 408 may comprise additional information, such as vehicle information or previous itineraries 200. Toggling the actions in actions pane 408 may cause a new child window to display over or within driver interface 400. In some embodiments, toggling the actions in actions pane 408 may cause the application to open the relevant item in a separate window of the application.

In some embodiments, driver interface 400 may comprise a control (not shown) for accepting or acknowledging break 322. Upon acceptance of break 322, break 322 may be configured to start at the specified break time. Acceptance of break 322 may override other conditions for starting break 322, such as driver 316 arriving at the specified break location. For example, acceptance of break 322 may cause break 322 to start at the specified time even if driver 316 has yet to reach the specified break location.

Driver interface 400 may also be configured to notify drivers 316 of various information related to breaks 322. For example, driver interface 400 may cause the display of a notification five minutes prior to break 322 starting, a notification when break 322 starts, a notification five minutes prior to break 322 ending, a notification when break 322 ends, or a combination thereof. The notifications may be configurable by drivers 316 such that drivers 316 can select to only be notified two minutes before break 322 starts and ends, for example. Notifications may be sent to drivers 316 via a mobile phone and may be presented as a push notification, an audio cue, a text message, a phone call, or a combination thereof.

As described above, drivers 316 may be required to perform a circle check or other similar safety check before, during, or after their shift. Drivers 316 may perform the safety check and upload images or a vehicle description for the safety check via driver interface 400 for review or storage by the transit agency or fleet manager.

Figure 5:
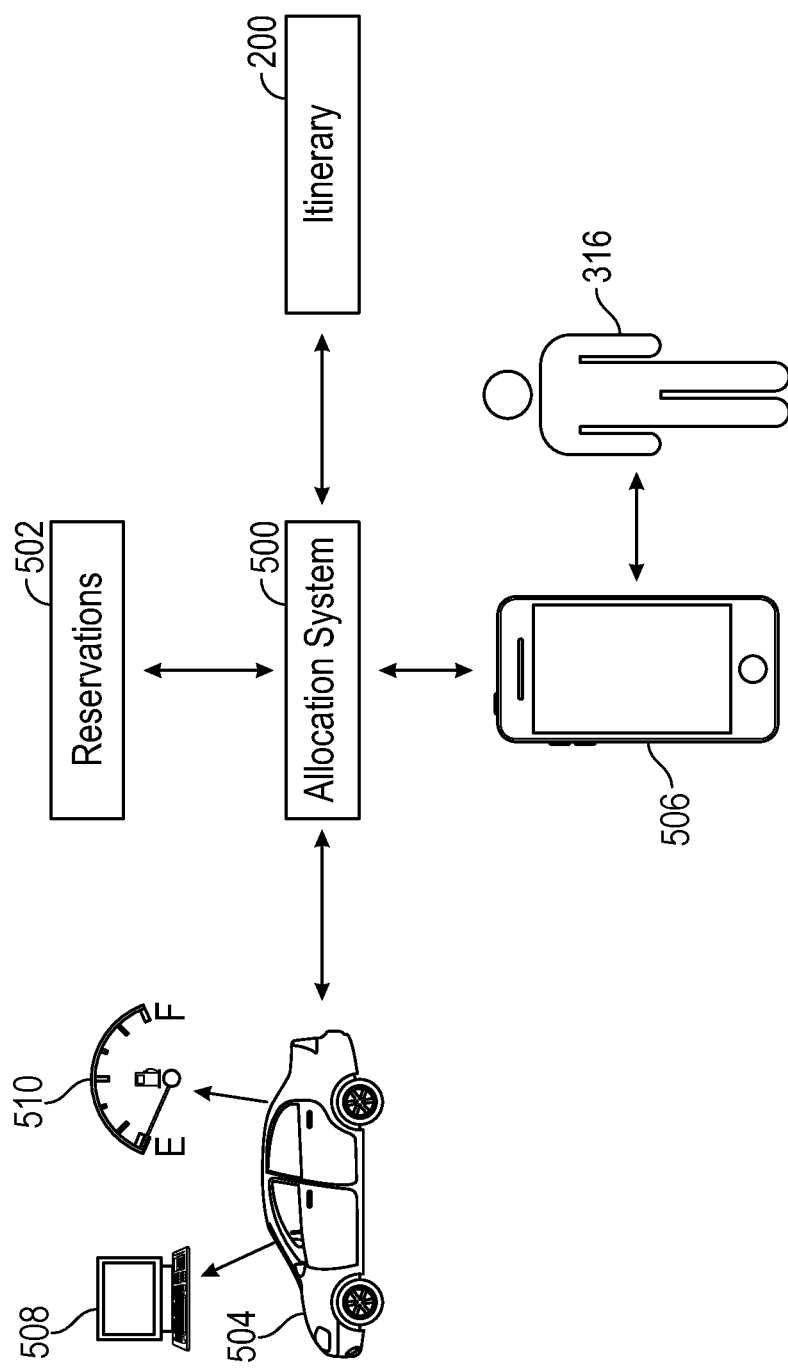
FIG. 5 illustrates an overview of an allocation system for the ride-sharing service.

FIG. 5 illustrates allocation system 500 for implementing the components of the ride-sharing service for some embodiments. As described in the '913 Patent, the entirety of which is hereby incorporated by reference, allocation system 500 may allocate transportation resources to meet the various transportation requirements set forth by passengers 210 booking ride-shared trips. As illustrated, allocation system 500 may be communicatively coupled with at least one of reservation system 502, itinerary 200, vehicles 504, or mobile devices 506. In some embodiments, mobile devices 506 are associated with drivers 316, and allocation system 500 may communicate various information for the ride-sharing service to drivers 316 via mobile devices 506. For example, mobile devices 506 may run an application comprising driver interface 400 for communicating breaks 322 to drivers 316 as described above with respect to FIG. 4. In some embodiments, when reservation system 502 reserves a refueling/recharging station for driver 316, the reservation information may be communicated to driver 316 via mobile device 506. Mobile devices 506 may also comprise location sensors, such as GPS sensors, such that the location of drivers 316 can be tracked.

Allocation system 500 may be configured to interface with various reservation systems 502 for scheduling breaks 322 for vehicles 504. In some embodiments, reservation system 502 may be configured as one or more APIs as described above. In some embodiments, reservation system 502 is configured to check the availability of a fueling and/or recharging station for vehicles 504. Reservation system 502 may check the availability in real-time as drivers 316 are following itinerary 200 and/or reservation system 502 may check future availability for pre-planning itinerary 200 using the pre-travel optimizer. Reservation system 502 may also dynamically reserve and cancel reservations at fueling and/or recharging stations based on the dynamically changing conditions, such as traffic conditions and newly-booked rides in itinerary 200. Cancelling and rescheduling of fueling/charging stations may be done in response to a better-optimized itinerary 200 as variations of itinerary 200 are iterated. For example, if a new itinerary 200 is generated in response to a new ride request, a previously scheduled recharging or refueling break for a vehicle 504 may be cancelled to service the new ride request. Similarly, a cancellation of a ride request may open time in itinerary 200 allowing for reservation system 502 to schedule a refueling/recharging break 322 for vehicle 504. In some embodiments, reservation system 502 is configured to confirm a reservation at a fueling/recharging station.

In some embodiments, reservation system 502 reserves refueling spots for drivers 316 based on the availability of a recharging station. As described above, recharging/refueling stations are selected based on their proximity to drivers 316. If the nearest recharging station has no openings, reservation system 502 may look for the next closest recharging station that has an opening to make a recharging reservation. Alternatively, reservation system 502 may search along the path of itinerary 200 for a recharging station to which vehicle 504 will be close as it moves along on itinerary 200. In some embodiments, allocation system 500 is configured for reservation system 502 to schedule a refueling or recharging break for all drivers 316 in itinerary 200 before their shift ends. For example, if drivers 316 are driving fleet vehicles 504, it may be desired for the fleet vehicles 504 to be fully refueled/recharged before the next day of service. In some embodiments, a fueling/charging break 322 is scheduled for after the shift for driver 316 ends, and driver 316 serves the fueling/charging break 322 after their shift ends.

In some embodiments, vehicle 504 comprises onboard computer 508 and fuel gauge/charge gauge 510, and allocation system 500 interfaces with vehicle 504 via onboard computer 508 and/or fuel gauge/charge gauge 510. For example, onboard computer 508 may be configured to alert allocation system 500 when onboard computer 508 detects fuel gauge/charge gauge 510 reaching a threshold fuel or charge level. In some embodiments, allocation system 500 communicates fuel/charge alerts detected at onboard computer 508 to mobile devices 506. The current level of fuel/battery for vehicle 504 may also influence the reserving of a fueling/charging station for vehicle 504. For example, if vehicle 504 hits the threshold fuel/battery level, reservation system 502 may automatically reserve a spot at a refueling station for vehicle 504. In some embodiments, itinerary 200 may be dynamically adjusted to make time for the vehicle 504 to have time to refuel/recharge. Similarly, a predicted amount of fuel/battery usage may be used to determine breaks 322 in itinerary 200. For example, the pre-travel optimizer may have reservation system 502 reserve stations for vehicles 504 based on an expected fuel or battery usage for scheduled rides. Once reservation system 502 reserves a station, the reservation may be communicated to itinerary 200 (via allocation system 500) and the refueling/recharging break 322 inserted into itinerary 200. In some embodiments, once the refueling/recharging break 322 is inserted into itinerary 200, itinerary 200 may be re-optimized to determine if any rides or driver breaks 322 should be shifted.

In some embodiments, the availability of an index in itinerary 200 may also influence refueling break 322 scheduling. Allocation system 500 may look for periods or indices in itinerary 200 in which a driver 316 is not servicing a ride. If driver 316 has time to refuel/recharge without substantially impacting the serving of rides, allocation system 500 may schedule a break 322 for driver 316 to refuel. In some embodiments, refueling locations are selected to minimize a travel distance for driver 316 to travel to arrive at their next pick-up. For example, reservation system 502 may reserve a recharging station for a driver 316 that is nearest to the next pick-up location even if the recharging station is not the nearest recharging station to the current location of driver 316.

Figure 6:
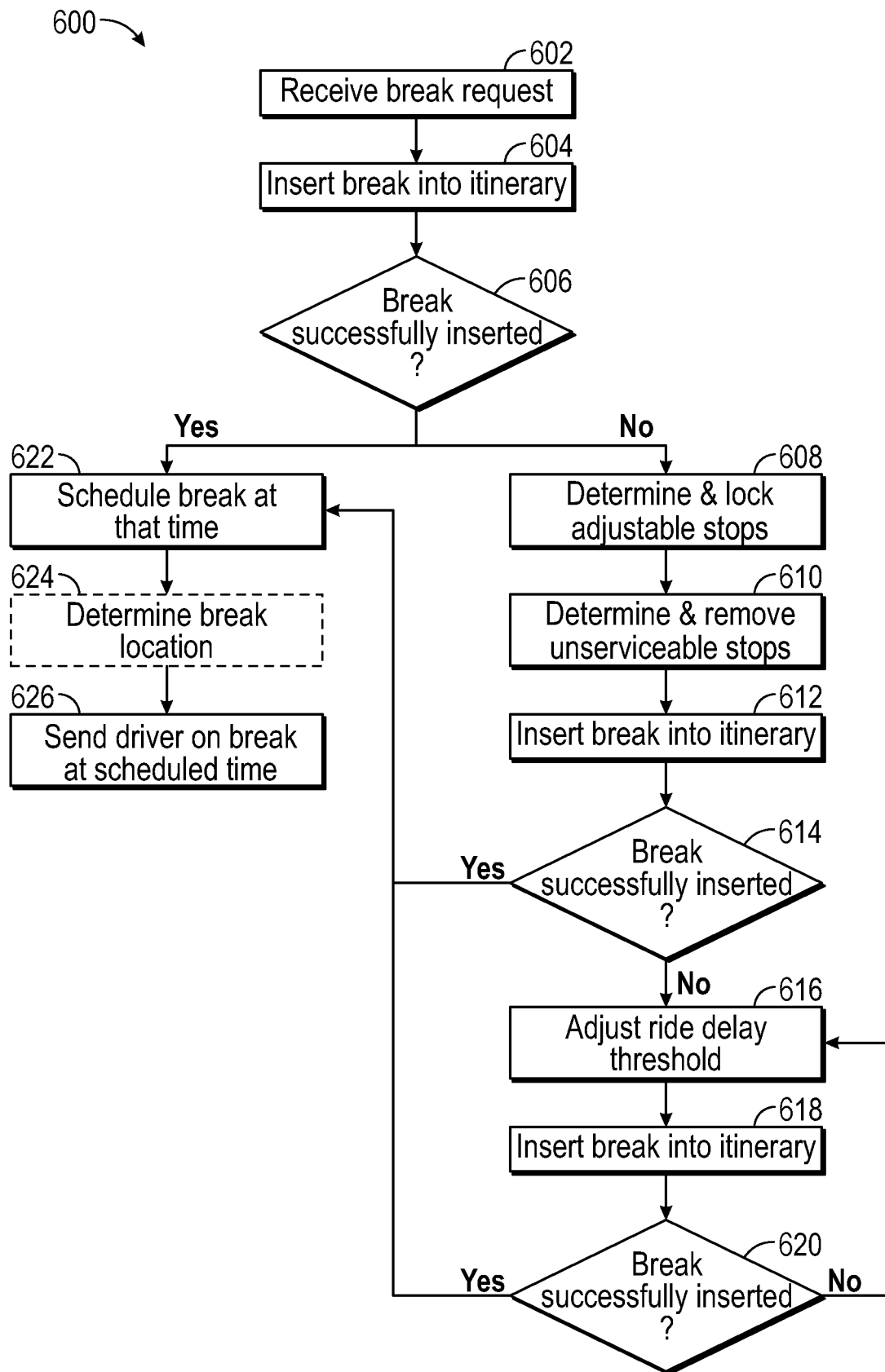
FIG. 6 illustrates an exemplary method for dynamically scheduling driver breaks in the ride-sharing service.

FIG. 6 illustrates an exemplary method 600 for dynamically scheduling driver breaks 322 with allocation system 500 for certain embodiments. In some embodiments, method 600 is implemented in real-time using the real-time optimizer. In some embodiments, method 600 is implemented prior to the scheduled day for itinerary 200 using the pre-travel optimizer. The pre-travel optimizer may help in reducing the necessary computing time to run method 600 in real-time by attempting to optimally schedule breaks and trips without factors such as real-time weather and traffic conditions. Executing method 600 in real-time may then allow for breaks 322 and rides to be dynamically shifted based on changing parameters such as real-time traffic conditions and trip cancellations. Other factors such as driver no-shows and vehicle malfunctions may also lead to breaks 322 and rides shifting.

At step 602, a break request comprising break parameters may be received. As used herein, a break request comprises any event in which a request to add break 322 into itinerary 200 is made. The break request may be received in various ways. For example, the break request may be received upon initialization of itinerary 200 sometime before the day associated with itinerary 200. In some embodiments, the break request is received via an interface for creating itinerary 200. An operator (e.g., a manager at the transit agency or fleet operator) may be able to configure the break parameters via the interface. A warning may be displayed if the operator attempts to schedule breaks when itinerary 200 is currently in-progress for the day. In some embodiments, the break request is received directly from drivers 316 and may be received via driver interface 400 on mobile device 506. For example, drivers 316 may request a five minute break 322 to use the restroom or to refuel the vehicle. In some embodiments, drivers 316 may request break 322 to be provided within a set amount of time, such as within the next 25 minutes. When drivers 316 request break 322, drivers 316 may input additional information related to break 322. For example, drivers 316 may indicate that break 322 is for refueling. As such, an estimated time may be generated for the break time for drivers 316 when requesting break 322 based in part on the event associated with the break. Events such as refueling or a restroom break may be estimated as a five-minute break, for example. When drivers 316 are driving an electric vehicle 504, the estimated break time for recharging may be fifteen minutes for a rapid charging station. Generally, the break request will comprise break parameters, such as a time frame in which break 322 should be served, along with a duration for break 322. In some embodiments, the break request may comprise one or more break locations.

In some embodiments, the break request is generated automatically in response to external data. For example, onboard computer 508 on vehicle 504 of first driver 308 may indicate that first driver 308 is low on fuel and needs to refuel soon. In some embodiments, a break request may be created for the driver to go on break 322 as soon as the current stop 204 is complete in response to the low fuel detection. Similarly, if first driver 308 is driving an electric vehicle 504, onboard computer 508 may be configured to detect a charge level of a battery for the electric vehicle and automatically insert a break into itinerary 200 when the battery charge is low. In some embodiments, various parameters must be satisfied for break 322 to be inserted into itinerary 200 in response to a low battery or low fuel level. For example, if a low fuel level is detected at fuel gauge/charge gauge 510 near the end of a shift, break 322 may not be scheduled if the shift can be completed with the remaining fuel. Other parameters, such as an estimated mileage to be incurred on upcoming stops 204, remaining battery level, or time-in service, may be factored into the determination for inserting a refueling or recharging break 322. The time before shift ends, estimated mileage, remaining battery or fuel level, and time-in service, alone or in combination, may be factored into the optimization of itinerary 200 and the calculation of the objective values for itinerary 200.

In some embodiments, the break request is configured to allow for drivers 316 to return to a home location at the end of their shift. Utilizing breaks 322 in this manner may allow for drivers 316 to end their shift without being assigned new stops 204 based on new ride requests near the end of their shift that would force drivers 316 to drive past the time when their shift was scheduled to end.

Once the break request is received, an attempt to insert breaks 322 into positions or indices of itinerary 200 may be made at step 604. Step 604 may be done using the pre-travel optimizer when initializing itinerary 200 rather than in real-time. In some embodiments, breaks 322 are inserted randomly when creating itinerary 200 to avoid periods in which all vehicles are on break 322, which may not allow for passengers 210 to book rides. In some embodiments, a metric tracking the amount of time between a currently assigned break time and break window start time 304 may be employed to encourage breaks 322 to begin near break window start time 304. In some embodiments, step 604 is taken in real-time, such as when the break request is received from a driver 316 requesting a break 322 during their shift. In some embodiments, an attempt to insert breaks 322 into itinerary 200 is done every time a new ride request is received. Thus, an attempt to optimize itinerary 200 may be taken every time the new ride request is received by recalculating the objective value. In some embodiments, itinerary 200 is optimized periodically to determine an itinerary 200 with the best objective value in response to dynamically changing information.

Inserting breaks 322 into itinerary 200 may be done as a pre-processing step. In some embodiments, break insertion is done using a naïve insertion that inserts the break stop at a best guess of an appropriate stop 204 within itinerary 200. The naïve insertion may be done heuristically. In some embodiments, metaheuristic techniques are used for inserting breaks 322 and rides within the pre-travel optimizer and for dynamically scheduling and rescheduling breaks 322 and rides in real-time. In some embodiments, breaks 322 are inserted into itinerary 200 using a greedy insertion, or variations thereof, such as a pure greedy insertion, an orthogonal greedy insertion, or a relaxed greedy insertion. In some embodiments, breaks 322 are only inserted one time and rides are inserted and removed relative to breaks 322 to optimize itinerary 200.

At step 606, it may be determined whether the break 322 inserted at step 604 was successfully inserted into itinerary 200. In some embodiments, a successful insertion is an insertion in which itinerary 200 is validated after the breaks are inserted. In some embodiments, validating itinerary 200 comprises determining that all stops 204 (including the scheduled breaks 322) in itinerary 200 are able to be completed within the constraints defined by passengers 210. Validating each stop 204 in itinerary 200 may comprise a forward-looking validation to determine if ETA 206 for stop 204 matches the scheduled time to complete stop 204. If allocation system 500 is unable to service any scheduled rides, itinerary 200 may be considered to be invalid. For example, if passenger 210 scheduled a pickup at 2:10 pm, but ETA 206 is at 2:30 pm (due to traffic, weather, etc.), this may be considered to be invalid. Determining the validity of itinerary 200 is discussed in more detail in the '913 Patent, which is hereby incorporated by reference. If itinerary 200 is validated at step 606, processing may proceed to step 622. If itinerary 200 is not validated at step 606, processing may proceed to step 608.

At step 608, when itinerary 200 has not been validated and breaks 322 were unsuccessfully inserted, stops 204 of itinerary 200 that are determined to be non-adjustable are locked from being adjusted. To determine non-adjustable stops 204 of itinerary 200, various status data may be analyzed. Status data may comprise driver data, vehicle data, passenger 210 data, capacity data, traffic data, weather data, road conditions data, location data, vehicle speed data, cancelled trips, no-show passengers 210, no-show drivers 316, and the like. The status data may be utilized to rearrange stops 204 of itinerary 200, as described in detail in the '913 Patent. The completed stops 204, the currently in-progress stop 204, and the to-be-completed stops 204 may also be analyzed to determine non-adjustable stops 204 of itinerary 200. In some embodiments, completed stops 204 are locked as non-adjustable to prevent completed stops 204 from being rearranged in itinerary 200. Itinerary 200 may also lock any stops 204 that are associated with any currently in-vehicle passengers 210. In some embodiments, stops 204 that are scheduled to be completed within a certain time frame (e.g., the next fifteen or thirty minutes) may be locked as non-adjustable.

Next, at step 610, stops 204 that were not locked and are determined to be unserviceable stops 204 may be removed from itinerary 200. Determining unserviceable stops 204 may comprise validating all adjustable stops 204 (i.e., all stops 204 not locked at step 608) to determine if the adjustable stops 204 can still be serviced on-time. The current traffic and weather conditions may be analyzed to determine if the rides can be serviced. In some embodiments, stops 204 that cannot be serviced on-time are removed from itinerary 200. In some embodiments, an attempt may be made to violate some of the constraints defined by passengers 210. For example, a passenger 210 who chose to ride without any other passengers 210 may be offered a ride with other passengers 210 in order for the ride to be serviced on time. Other ride constraints such as pick up/drop-off times, maximum travel time, an arrive-before time, a depart-after time, a pick-up time window, or pick up/drop-off locations may be violated as well in order to service all rides. For example, the pick-up time may be changed by five minutes, and the pick-up location 208 may be shifted to a block away from the requested pick-up location 208. Stops 204 that are still unable to be serviced when passenger 210 constraints are violated may be removed from itinerary 200. In some embodiments, stops 204 are removed heuristically using a removal heuristic, such as a match removal algorithm.

Next, at step 612, a second attempt to insert breaks 322 into itinerary 200 may be made. Like step 606, inserting breaks 322 at step 612 may be done heuristically. In some embodiments, a greedy insertion is used to insert breaks 322 at step 612. Next, at step 614, it is again determined whether breaks 322 were successfully inserted into itinerary 200. Step 614 may be substantially similar to step 606. Itinerary 200 may again be validated, as described above, to determine whether breaks 322 were successfully inserted or not. If breaks 322 were successfully inserted, processing may proceed to step 622. If breaks 322 were not successfully inserted, processing may proceed to step 616.

At step 616, when it is determined that the second attempt to insert breaks 322 into itinerary 200 has failed, a relative delay threshold may be adjusted. In some embodiments, the relative delay is a metric that measures the travel delay caused by passenger 210 utilizing a ride-sharing service as compared to passenger 210 driving themselves from the pick-up location to the drop-off location. In some embodiments, the relative delay measures the increase in travel distance for passenger 210 utilizing the ride-share service compared to passenger 210 driving themselves directly from the pick-up location to the drop-off location. In some embodiments, itinerary 200 is determined utilizing various heuristics that attempt to minimize the relative delay metric. In some embodiments, passengers 210 may configure a relative delay tolerance which may be a passenger 210 constraint as described above. For example, passenger 210 may choose to have no more than a ten-minute delay caused by utilizing the ride-sharing service. Thus, itinerary 200, in some embodiments, is generated such that any stops 204 involving passenger 210 do not take more than ten minutes to complete than if passenger 210 had driven themselves. In some embodiments, the relative delay may be a default system parameter and passengers 210 are unable to modify the relative delay. In some such embodiments, the relative delay is dynamic and varies based on demand. For example, the relative delay may increase during peak hours when it is more likely for rides to be delayed, and the relative delay may decrease during off-peak hours when rides are more likely to be serviced on time. Consequently, at step 616, the relative delay threshold may be adjusted (i.e., increased) to attempt to service all rides and breaks 322. The relative delay threshold may be increased for all adjustable stops 204 or for a subset of all adjustable stops 204. For example, it may be desirable to only increase the relative delay during break window 302 to aid in serving breaks 322. Once break window 302 has closed, the relative delay may be decreased because all drivers 316 will then be available to service all passengers 210.

After the relative delay threshold has been increased, a third attempt may be made to insert the breaks into itinerary 200 at step 618. Similar to the above-described steps 606 and 612, the breaks may again be inserted heuristically at step 618. At step 620, another determination of successful break 322 insertion is made. Again, itinerary 200 may be validated to determine if breaks 322 were inserted successfully. If breaks 322 were inserted successfully, processing proceeds to step 622. If breaks 322 were unsuccessfully inserted, processing returns to step 616 and the relative delay threshold may be increased again.

Next, at step 622, where it has been determined that breaks 322 were successfully determined at one of step 606, step 614, or step 620, break 322 is scheduled in itinerary 200 at the inserted time and constrained to itinerary 200. As used herein, once a break 322 is constrained to itinerary 200, the break cannot be removed from itinerary 200; however, once constrained, breaks 322 may still be moved and shuffled within itinerary 200 in response to dynamically changing conditions. Once breaks 322 are constrained, unlocked, and removed stops 204 may be reinserted into itinerary 200 as described in detail in the '913 Patent, the entirety of which is incorporated by reference herein. Breaks 322 may also be assigned and mapped to vehicle bookings at step 622. Break assignments may comprise at least one of the break 322 being assigned, the vehicle 504 to which break 322 is being assigned, or the current status (e.g., assigned, in progress, or complete) of break 322.

At optional step 624, the break location for break 322 is determined. As described above, breaks 322 may be associated with a break location, such as a coffee shop, a restaurant, a rest stop, a vehicle fueling station, a vehicle charging station, a check-in location for an autonomous vehicle 504, or a home location associated with the transit agency or fleet operator. The break location may be determined dynamically by analyzing the current location of the driver 316, the last completed stop 204, the first stop 204 to-be-completed after the driver finishes break 322, or a combination thereof. In some embodiments, no break location is specified, and the current location of the driver 316 is used as the break location.

Next, at step 626, the driver 316 serves break 322 at the assigned time. Break 322 may begin when it is determined that the driver 316 has reached the assigned break location. In some embodiments, break 322 begins automatically at the break start time. In some embodiments, the driver 316 actuates a control within driver interface 400 to initiate break 322.

In some embodiments, method 600 is cycled multiple times in an attempt to optimize itinerary 200. As described above, it is often desired to reduce an objective value, such as the relative delay, when generating itinerary 200. In some embodiments, all itineraries 200 for the ride-sharing service are collectively analyzed to determine a globally optimal schedule for breaks 322 for drivers 316. In some embodiments, all itineraries 200 for the ride-sharing service are collectively analyzed to determine a globally optimal break window 302 for drivers 316. In some embodiments, breaks 322 may be scheduled such that there is minimal overlap between drivers 316 going on break. As such, multiple cycles of method 600 may be run while calculating the objective value for each cycle. In some embodiments, the cycles may be performed in parallel using the distributed computing framework as described above. For example, multiple itineraries 200 may be created, with each itinerary changing the relative delay threshold by a different amount. The itinerary 200 with the best objective value may then be selected. By processing the objective value in parallel, the computational efficiency may be increased, and multiple itineraries 200 may be generated at once, with the itinerary 200 having the best objective value selected for implementation. Parallel processing may also provide benefits by allowing for the computational workload to be distributed and for the response time of allocation system 500 to be improved.

While embodiments have been discussed herein with respect to scheduling breaks 322 for drivers 316, breaks 322 may instead be scheduled for various other events. In some embodiments, the transit agency or fleet operator may employ electric vehicles 504 which may need periodic recharging. As such, breaks 322 may be scheduled to ensure the electric vehicle 504 is charged at the most opportune times in itinerary 200. Similarly, refueling times may be scheduled for drivers 316 to refuel vehicles that run on gasoline.

As another example, autonomous vehicles 504 may be used to transport passengers 210. Autonomous vehicles 504 may need periodic maintenance, refueling, or recharging. Each of these events may be implemented as a "break" and scheduled accordingly. For refueling, recharging, or maintenance, break locations may be set to be a gas station, an electric vehicle charging station, a mechanics shop, or the like.

It should be noted that embodiments are not limited to scheduling breaks for drivers 316 or autonomous vehicles 504 operating in a ride sharing fleet. Transit agencies, fleet operators, and other transportation industries and fields, such as food or package delivery companies, that utilize fleet operations may benefit from the dynamic break scheduling as described herein. For example, a pizza shop may schedule breaks 322 and deliveries based on real-time and pre-ordered pizza orders. Breaks 322 could be scheduled such that delivery drivers are configured to return to the pizza shop for each break 322, for example.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of dynamically scheduling breaks in a ride-sharing service, comprising:
   receiving a break request for a driver in the ride-sharing service, the break request comprising a set of break parameters for scheduling a break;
   accessing an itinerary for the ride-sharing service,
   wherein the itinerary comprises a plurality of stops, each stop of the plurality of stops comprising at least one of a pick-up time, a pick-up location, a drop-off time, a drop-off location, or the break;
   attempting an insertion of the break at an index of the itinerary;

performing, in real time and based at least in part on GPS location data obtained from a sensor associated with the driver, a validation of the itinerary to determine if the plurality of stops can be serviced by the ride-sharing service;

if the validation of the itinerary was unsuccessful, modifying the itinerary, the modifying comprising a reindexing of at least one stop of the plurality of stops or the break in the itinerary to obtain an updated itinerary;

performing a validation of the updated itinerary to determine if the plurality of stops can be serviced by the ride-sharing service;

if the validation of the updated itinerary was successful, constraining the break to the updated itinerary; and communicating the updated itinerary to the driver in the ride-sharing service.

2. The method of claim 1, further comprising:
specifying the set of break parameters,
wherein the set of break parameters comprises at least one of an earliest start time, a latest end time, a break duration, or one or more break locations.

3. The method of claim 2, further comprising selecting a break location from the one or more break locations to minimize a travel duration between a last stop before the break, the break itself, and a first stop after the break.

4. The method of claim 1, further comprising:
receiving a new ride-share request; and
adjusting a break time for the break based on the new ride-share request to service the new ride-share request.

5. The method of claim 1, further comprising:
receiving a new ride-share request comprising a pick-up time; and
adjusting the pick-up time for the new ride-share request to provide the break.

6. The method of claim 1,
wherein the driver is a first driver and the itinerary is a first itinerary, and
wherein the method further comprises:
 receiving an additional ride-share request comprising a pick-up time, the additional ride-share request received from a second itinerary associated with a second driver; and
 adjusting the pick-up time for the additional ride-share request to provide the break.

7. The method of claim 1, further comprising:
determining if a break condition for the break is satisfied,
in response to determining the break condition is not satisfied, reindexing the break in the itinerary.

8. A system for dynamically scheduling breaks in a ride-sharing service, comprising:
a processor;
a data store;
a plurality of vehicles; and
one or more non-transitory computer-readable media storing computer-executable instructions that, when executed by the processor, perform a method of dynamically scheduling breaks in the ride-sharing service, comprising:
 receiving a break request for a driver in the ride-sharing service, the break request comprising a set of break parameters for scheduling a break,
 wherein the driver is associated with a vehicle of the plurality of vehicles;
 accessing an itinerary for the ride-sharing service,
 wherein the itinerary comprises a plurality of stops, each stop of the plurality of stops comprising at least one of a pick-up time, a pick-up location, a drop-off time, a drop-off location, or the break;
 attempting an insertion of the break at an index of the itinerary;
 performing, in real time and based at least in part on GPS location data obtained from a sensor associated with the driver, a validation of the itinerary to determine if the plurality of stops can be serviced by the ride-sharing service;
 if the validation of the itinerary was unsuccessful, modifying the itinerary, the modifying comprising a reindexing of at least one stop of the plurality of stops or the break in the itinerary to obtain an updated itinerary;
 performing a validation of the updated itinerary to determine if the plurality of stops can be serviced by the ride-sharing service;
 if the validation of the updated itinerary was successful, constraining the break to the updated itinerary; and
 communicating the itinerary to the driver in the ride-sharing service.

9. The system of claim 8, wherein the computer-executable instructions are further executed to perform the steps of:
if the validation of the updated itinerary was unsuccessful, adjusting a relative delay threshold and modifying the updated itinerary to obtain a modified updated itinerary;
performing a validation of the modified updated itinerary to determine if the plurality of stops can be serviced by the ride-sharing service;
if the validation of the modified updated itinerary was successful, constraining the break to the modified updated itinerary; and
communicating the modified updated itinerary to the driver in the ride-sharing service.

10. The system of claim 8, wherein the break request is received in response to a set of external sensor data.

11. The system of claim 10, wherein the set of external sensor data comprises a fuel level or a charge level of the vehicle.

12. The system of claim 8,
wherein the computer-executable instructions are further executed to perform the step of determining if a break condition for the break is satisfied, and
wherein the break condition is satisfied if a vehicle of the plurality of vehicles associated with the driver has no passengers at a break start time, the break starts after an earliest start time, and the break ends before a latest end time.

13. The system of claim 8, wherein the break request is received from the driver.

14. The system of claim 8,
wherein the vehicle is an electric vehicle, and
wherein a break location associated with the break is a recharging station for the electric vehicle.

15. One or more non-transitory computer-readable media storing computer-executable instructions that, when executed by a processor, perform a method of dynamically scheduling breaks in a ride-sharing service, comprising:
receiving a break request for a plurality of breaks, the break request comprising a set of break parameters,
wherein each break in the plurality of breaks is associated with a driver of a plurality of drivers in the ride-sharing service;
accessing an itinerary for the ride-sharing service,
wherein the itinerary comprises a plurality of stops, each stop of the plurality of stops comprising at least one of a pick-up time, a pick-up location, a drop-off time, a drop-off location, or a break in the plurality of breaks;

attempting an insertion of the plurality of breaks into the itinerary, each break of the plurality of breaks inserted into an index of the itinerary;

performing, in real time and based at least in part on GPS location data obtained from a plurality of sensors associated with the plurality of drivers, a validation of the itinerary to determine if the plurality of stops can be serviced by the ride-sharing service;

if the validation of the itinerary was unsuccessful, modifying the itinerary, the modifying comprising a reindexing of at least one stop of the plurality of stops or a break of the plurality of breaks in the itinerary to obtain an updated itinerary;

performing a validation of the updated itinerary to determine if the plurality of stops can be serviced by the ride-sharing service;

if the validation of the updated itinerary was successful, constraining the break to the updated itinerary; and communicating the updated itinerary to the plurality of drivers in the ride-sharing service.

16. The media of claim 15, wherein the break request comprises an earliest break start time and a latest break end time forming a break window in which the plurality of breaks must be provided.

17. The media of claim 15, wherein the method further comprises the steps of:
   receiving a set of external data, the set of external data comprising at least one of traffic conditions, road conditions, or weather conditions; and
   in response to receiving the set of external data, adjusting an index of at least one break of the plurality of breaks within the itinerary.

18. The media of claim 15,
wherein the plurality of breaks is inserted into the itinerary in order to minimize a metric of relative delay, and
wherein the metric of relative delay measures a time loss resulting from utilizing the ride-sharing service.

19. The media of claim 15,
wherein the plurality of breaks comprises a first break at a first time associated with a first driver at a first location and a second break at a second time associated with a second driver at a second location,
wherein the method further comprises:
   receiving a new ride request near the first time and near the first location; and
   in response to receiving the new ride request, adjusting the plurality of breaks within the itinerary such that the first break is served at the second time and the second break is served at the first time to service the new ride request.

20. The media of claim 15,
wherein the driver is a first driver and the itinerary is a first itinerary, and
wherein the method further comprises:
   receiving an additional ride-share request, the additional ride-share request received from a second itinerary associated with a second driver of the plurality of drivers; and
   adjusting a break time for a break of the plurality of breaks based on the additional ride-share request to service the additional ride-share request.

* * * * *